United States Patent [19]

Newman

[11] Patent Number: 4,548,007
[45] Date of Patent: Oct. 22, 1985

[54] BUILDING PANEL CONSTRUCTION

[76] Inventor: LaRue S. Newman, 2033 S. Eureka Ave., Springfield, Mo. 65804

[21] Appl. No.: 590,160

[22] Filed: Mar. 16, 1984

[51] Int. Cl.[4] .......................... E04C 1/00; E04C 2/34; B28B 1/16

[52] U.S. Cl. .............................. 52/309.11; 52/309.12; 52/741; 52/806; 52/808; 264/219; 264/256; 264/261

[58] Field of Search ................ 52/309.11, 309.12, 741, 52/806, 808; 264/219, 256, 261

[56] References Cited

U.S. PATENT DOCUMENTS

| | | | |
|---|---|---|---|
| 3,085,666 | 4/1963 | Lydard | 189/86 |
| 4,099,355 | 7/1978 | Strunk | 52/404 |
| 4,191,001 | 3/1980 | L'Heureux | 52/743 |
| 4,246,733 | 1/1981 | Haber | 52/309.11 |
| 4,253,288 | 3/1981 | Chun | 52/309.11 X |
| 4,318,258 | 3/1982 | Heck | 52/309.12 |

Primary Examiner—Michael R. Lusignan
Attorney, Agent, or Firm—Kokjer, Kircher, Bradley, Wharton, Bowman & Johnson

[57] ABSTRACT

A composite building panel and method of its construction wherein a preferably rectangular sheet is nailed to wooden strips extending around the sheet perimeter to define a form. A layer of portland cement and sand mortar is spread uniformly over the sheet within the form. A plurality of insulation blocks are applied directly to the wet mortar with uniform spacing between the respective blocks and between the blocks and the wooden strips. Mortar is then spread over the blocks, filling the voids left by such spacing and establishing a covering layer over the blocks. A second sheet is then nailed to the blocks and fasteners extend through the sheets and into the wet mortar grid throughout the panel. Upon hardening the panels are installed by the removal of one or more of the wooden strips so that the projecting margins of the sheets may be lapped with other construction elements to create a secure joint. Wooden blocks may be used with the peripheral strips to provide appropriate voids upon removal of the strips for accommodating electrical junction boxes as well as conduits.

Pursuant to an alternate embodiment, fluid tight, hollow containers are substituted for the insulation blocks to provide cavities in the panels for solar energy collection by the flow of a liquid through the interconnected container system.

11 Claims, 7 Drawing Figures

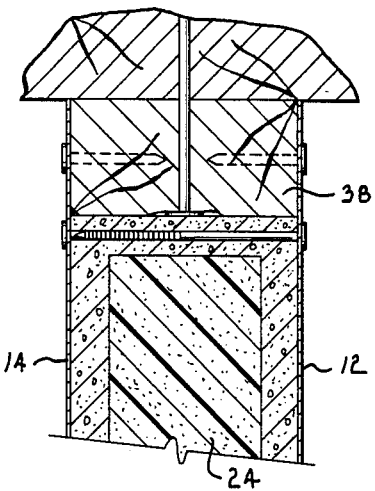
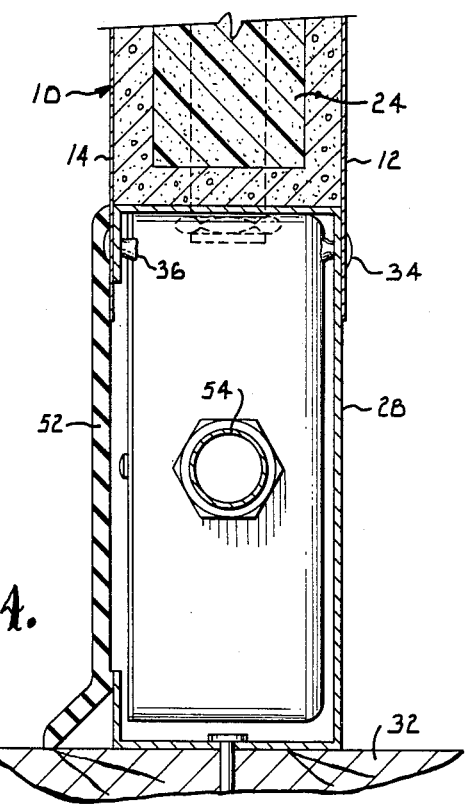
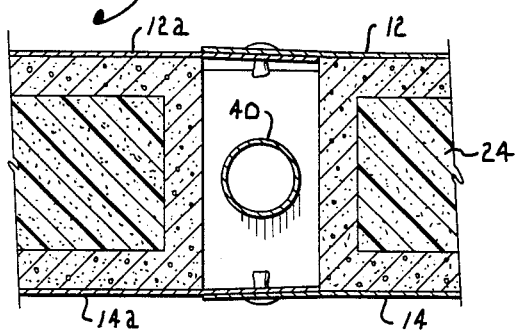
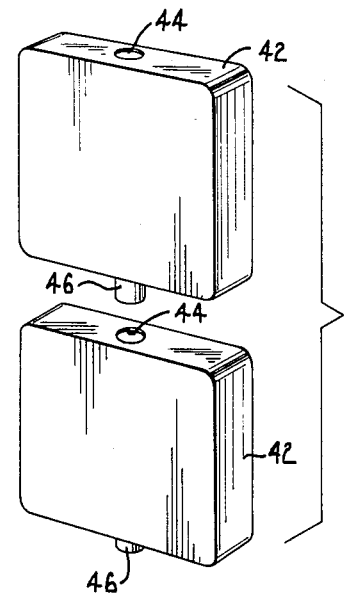
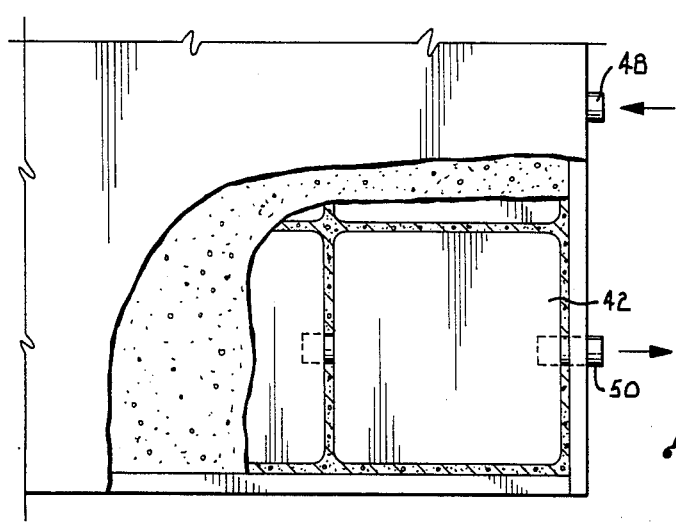

BUILDING PANEL CONSTRUCTION

This invention relates to building construction and more particularly to a novel prefabricated building panel and the method of construction thereof. The panel embodying the principals of this invention is particularly useful for providing partitioning to subdivide the interior of a large building into rooms, offices or the like, and for exterior curtain walls and roof panels of structurally framed buildings.

Sandwich type building panels have heretofore been proposed and are generally in relatively widespread use. However, the panels which have heretofore been proposed have been relatively expensive to fabricate and are less versatile than has been desired. Frequently the use of conventional panels has presented special problems in providing for the convenient and sightly placement within the panels of utility conduits, electrical outlets and similar accessary construction.

Accordingly, it is a principal object of the present invention to provide a building panel which may be easily and economically pre-fabricated and yet which may be quickly and easily erected at the job site with little or no field fabrication.

It is another important object of this invention to provide such an economically constructed building panel which is, nevertheless, very durable and which can be utilized with a minimum of finishing operations after it is installed.

A further object of the invention is to provide a panel construction wherein any edge of the panel can be easily adapted to provide a unique "mortise and tenon" type connection with other similarly constructed panels, with other building components, or to provide channels to house service conduits which are thereby concealed within the panel at the time the panel is installed. Other important objects of the instant invention include the providing of a wholly integrated, almost indestructable weatherproof building panel which is impervious to moisture, air infiltration, dirt, damage by rot, vermin, insects, and fire as required by many building and sanitary codes.

These and other important aims and objectives of this invention wil be further explained or will become apparent from the specification, drawings and appended claims.

In the drawings:

FIG. 3 is an enlarged, detailed cross-sectional view taken along line 3—3 of FIG. 2;

FIG. 4 is a view similar to FIG. 3 but taken along line 4—4 of FIG. 2;

FIG. 5 is another similar view taken along line 5—5 of FIG. 2;

FIG. 6 is an enlarged, exploded perspective view showing a pair of panel spacers pursuant to an alternate embodiment suitable for use with solar energy; and FIG. 7 is a fragmentary, enlarged side elevational view of a panel incorporating the spacers of FIG. 6, parts being broken away to reveal details of construction.

Figure 1:
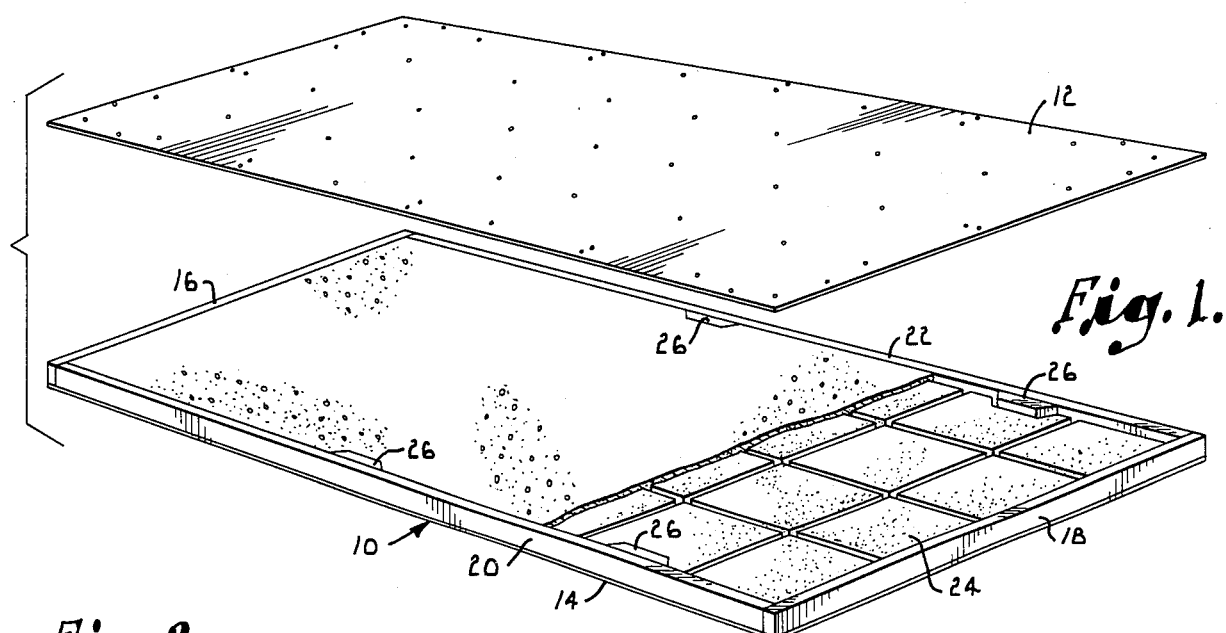
FIG. 1 is an exploded, perspective view of a reduced scale of a panel embodying the principals of this invention, parts being broken away to reveal details of construction.

Referring initially to FIG. 1 of the drawing, a panel constructed pursuant to the principles of this invention is broadly designated by the reference numeral 10. The panel comprises a top, substantially flat sheet member 12, preferably of steel or similar material, and a like bottom sheet member 14. Filler material as will be hereinafter explained is interposed between the spaced apart, generally parallel extending sheet members 12 and 14 to define the composite panel 10.

Panel 10 is constructed by first securing an elongated, upwardly extending, preferably wood strip to the peripheral marginal edges of the rectangular members 12 and 14 to provide a form for the construction of the panel. The strip is preferably segmented and includes end segments 16 and 18 as well as side segments 20 and 22 as illustrated in FIG. 1. The respective strip segments are fastened to member 14 by releasable means, preferably by the use of fasteners in the form of nails or the like which may be driven through the relatively thin sheet member material and into wood. Alternatively, the respective sheet members 12 and 14 might be pre-punched to not only facilitate the passage of nails or other fasteners through the members but to also insure proper placement of the components to secure the panel components together.

Once the basic form has been constructed in the foregoing manner, an initial layer of plastic or flowable but hardenable material such as a mixture of sand, portland cement and water is spread uniformly within the form over the bottom member 14. A layer of approximately ½ inch of this material is presently utilized in the construction of panels having a total thickness of slightly over 1½ inches. The specific formulation of the mortar is not particularly critical but a mixture of about one part portland cement to about four to six parts of screened sand mixed with sufficient water to present a workable mortar has been found satisfactory.

A plurality of spacers are next installed directly onto the unhardened mortar in the arrangement indicated by FIG. 1 of the drawing. The spacers, which are preferably polagonal having generally square major surfaces are, in the FIG. 1 embodiment, approximately one inch thick blocks of polyurethane foam insulation material. The blocks 24 are positioned with one major surface resting upon the unhardened mortar layer in the form and with approximately ¼ inch spacing between the respective blocks and a similar spacing between the outer edges of the peripheral blocks and the wooden strip segments. In order to provide for the installation of electrical outlets in walls formed from the panels, wooden blocks 26 having the same thickness as the respective strip segments 20 and 22 are secured to the latter at desired intervals when the form is constructed. The blocks 26 provide space for electrical outlet boxes when the wooden strip segments and blocks are removed as will be subsequently explained. Manifestly, the spacer blocks 24 at locations proximal the blocks 26 are shaped to accommodate the blocks and to maintain the approximatey ¼ inch spacing between the wooden blocks and the spacer blocks.

Once the spacer blocks 24 have been situated on the layer of wet mortar, a second layer of similar mortar is applied over these blocks in sufficient quantity to fill all of the space in the form to a depth of approximatey ¼ inch over the spacer blocks 24.

At this stage of construction, a composite panel comprises a bottom sheet member, a peripheral wooden form edge, a plurality of spacer blocks with a layer of mortar completely enclosing each of the blocks and presenting a grid throughout the composite panel. The top sheet member 12 is then applied over the second coat of mortar before the latter has hardened and is secured to the wooden peripheral frame, such as by nailing. Further, nails or similar fasteners are also applied through the sheet material at spaced intervals and directly into the wet mortar comprising the grid of the panel. The mortar is in intimate contact with each of the sheets 12 and 14 and will serve to bond the sheets to the remaining panel components. Further, the nails or fasteners enhance the connection of the outer sheets to the remainder of the panel.

Once the panel has been constructed as heretofore described, the mortar is allowed to set. The hardened mortar rigidifies the composite panel and serves to bind all of the elements together. Further, the external impervious shees and internal mortar eliminate all possibility for deterioration through the intake of water, air and other contaminants as will be readily understood.

The peripheral wooden segments 16, 18, 20 and 22 serve to protect the panels during shipping, handling and installation at the job site. Each of the segments is, however, readily removable by merely pulling the nails which secure the wooden segment to the proximal marginal edges of the sheet members. The projecting margins of the spaced apart sheet members define the sides of a channel formed by the removal of the wooden segment. Such channels facilitate the attachment of a panel of this construction with similarly constructed channels and also facilitates the installation of the panels at the building site. Further, such channels provide convenient locations for electrical conduits as will be hereinafter explained.

In FIG. 4, a panel 10 is shown installed on a generally C-shaped bracket 28 which is anchored by fastener 30 to a building floor 32. The projecting marginal edges of the sheets 12 and 14 are secured by fasteners such as rivets 34 and 36 to bracket 28 thereby securing the panel in its upright position. Removal of the wooden form segment from the opposite end of the panel also provides a similar channel which can be utilized for anchoring the panel to an overhead member 38 in substantially the same manner as heretofore described and as shown in FIG. 2 of the drawing.

The channels formed by removal of the side wooden members 20 and 22 permit adjacent panels to be interconnected as shown in FIG. 5 of the drawings. Note that the projecting margins of sheet members 12 and 14 slip past and overlap the projecting edges of members 12a and 14a of a similar panel to establish a mortise and tenon joint in the manner illustrated in the drawing. Suitable fasteners, not shown, such as pop rivets or the like can be utilized for interconnecting the respective proximal sheet members of the panels. It will be recognized that it is normally only necessary for the proximal wooden strip of only one of the two panels to be removed to effect a joint between adjacent panels of the type illustrated in FIG. 5. However, both wooden strip segments at the joint may be removed if desired to provide an upwardly extending channel in the panel at this location for accommodating, for example, an electrical conduit such as conduit 40 illustrated.

Figure 2:
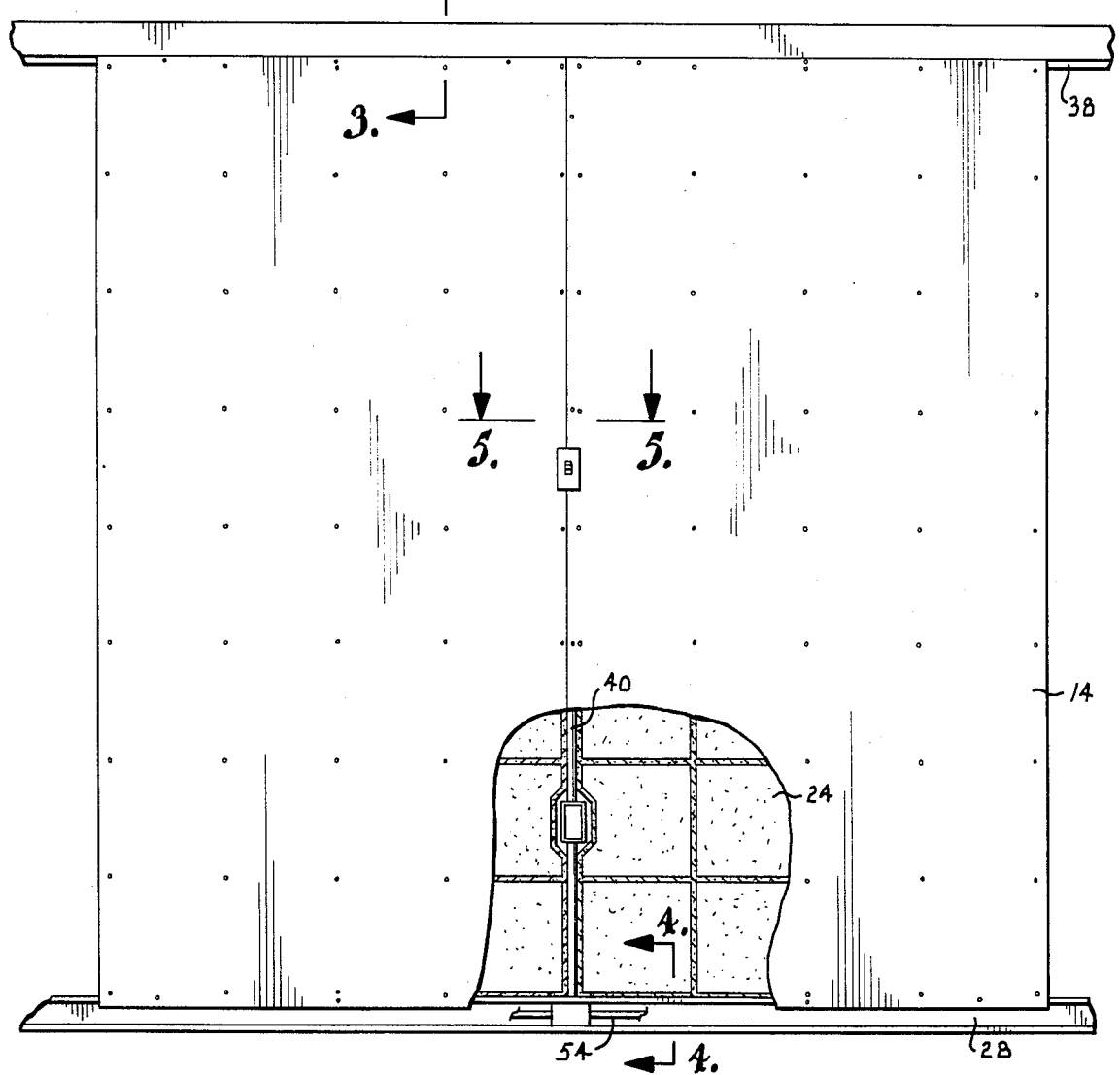
FIG. 2 is a fragmentary, side elevational view of a pair of panels interconnected and installed in a building, parts being broken away to reveal details of construction.

The space provided by the wooden blocks 26 when they are removed from the panel with the wooden segments to which they are attached provide adequate space for the installation of standard size electrical receptacles as shown in FIG. 2 of the drawing. This facilitates the installation of electrical lines, including telephone lines in a concealed relationship within the panels when the same are installed in a building.

FIGS. 6 and 7 show a modified construction wherein the polyurethane insulative spacer blocks 24 are omitted and hollow containers 42 are substituted therefore. Each container 42 is preferably formed of suitable plastic material for holding fluids therein. An opening 44 in one end thereof and an integral spout 46 in the opposite end permits the ingress and egress of fluid through the container. Openings 44 are sized so that a spout 46 may be inserted therein in a sealed relationship therewith to place the adjacent containers in mutual fluid communication.

The manner of constructing panels pursuant to the principals of this invention but utilizing the containers 42 is substantially the same as that heretofore described. The containers are interconnected with adjacent containers in the manner shown in FIG. 7 of the drawing and suitable inlet conduit segments 48 and outlet conduit segments 50 may be installed in certain of the openings 44 in containers 42 adjacent the periphery of a panel and through the form members to facilitate fluid interconnection between adjacent panels. The unused openings 44 of the perimeter containers are, of course, stoppered. The containers may be pressurized with compressed air or the like during the construction of the panels in order to prevent any tendency for the containers to collapse during fabrication. The containers comprise components of a solar energy gathering system whereupon a suitable liquid such as water, ethyleneglycol or the like can be circulated through the panels for the purpose of absorbing heat gathered from the sun.

In order to enhance a solar heating effect, means for collecting solar energy may be provided in conjunction with one or more of the sheet members forming the outer major surfaces of the panel. For example, a sheet member which is to be exposed to sunlight can be painted black to enhance the absorption of solar energy and increase the heating effect upon liquid within the containers 42 embedded in the panel.

It will be readily recognized by those skilled in the art that the composite panel contemplated by this invention is highly durable and versatile rendering the panel particularly well suited for uses for which such panels are employed. The panels may be quickly and economically fabricated satisfactory and yet are easy to install at the job site with little or no modification required. Should particular sizes be required to fit irregular or odd sized wall segments, the panels are subject to being cut as needed. The outer covering surfaces of the panels can be prepainted at the factory. Alternatively, relatively smooth surfaces may be painted or otherwise covered with suitable wall covering after installation. The C-shaped bracket 28 upon which panels are installed on a floor as illustrated in FIG. 4 can be closed with a conventional vinyl or suitable plastic base board strip 52 as shown in the drawing. This covers the electrical connections and horizontal conduit 54 so that only the electrical outlets and switches, together with suitable switch plates are visible in the typical multiple panel installation.

I claim:

1. A prefabricated building panel comprising:

a pair of generally parallel, spaced apart sheet members comprising the major surfaces of said panel;

a segmented strip interposed between said members and extending around the periphery of the panel;

releasable means securing said panels to the strip segments;

a plurality of slab shaped spacers interposed in mutually spaced apart disposition between the members and arranged in a plurality of transversely and longitudinally extending rows to define between said rows of spacers a grid of longitudinally and transversely extending voids across the panel, the spacers being spaced inwardly from the inner surfaces of said members and the strip segments respectfully; and an initially flowable, hardened, rigid material surrounding each spacer and completely filling the void between said members and between the respective adjacent spacers, said material being bonded to the inner surfaces of the members and defining a continuous grid of said rigid material throughout the panel binding the panel together and preserving the positional integrity of the spacers.

2. The panel of claim 1, wherein said spacers are comprised of thermal insulation material, thereby enhancing the insulation of the panel.

3. The panel of claim 2, wherein said insulation material is polyurethane foam.

4. The panel of claim 1, wherein said initially flowable hardened material is the product resulting from a mixture of sand, portland cement and water.

5. The panel of claim 1, wherein said sheet members are substantially rectangular sheets of metal, and wherein said strip includes a separate segment for each of the four sides of the panel defined by said rectangular members.

6. The panel of claim 5, wherein said segments are wooden, and wherein said releasable means includes a plurality of fasteners engaging the wooden segments and said members respectively, said fasteners being selectively removable to permit the removal of any of said segments as may be desired to create a channel between the spaced apart members at an edge of the panel to accommodate integration of other building components with the panel by installation of a component in said channel.

7. The panel of claim 1, wherein said spacers comprise hollow containers capable of holding fluid and wherein is provided conduit means placing the containers in mutual communication and communicating exteriorly of the panel, whereby fluid may be flowed through the panel to permit the latter to be used in solar heating applications.

8. The panel of claim 1, wherein at least one of said sheet members is provided with a black exterior surface to enhance the collection of solar energy for heating fluid in said containers.

9. A method of constructing a prefabricated building panel comprising:

creating a form for a plastic, hardenable material by securing an upwardly extending strip to the peripheral marginal edge of a substantially flat, sheet member;

spreading a layer of said plastic material over the surface of said member within the perimeter bounded by said strip;

placing a plurality of spacers on said layer of plastic material in mutually spaced apart disposition and spaced inwardly from said strip;

spreading a second layer of said plastic material over the spacers to cover the latter and to fill the space between the spacers and between the spacers and the strip;

installing a second, substantially flat member over said second layer of material and in intimate contact therewith; and permitting said material to harden to preserve the positional relationship between the panel components.

10. The method of claim 9, wherein said panel is polagonal, and wherein is included the step of removing said strip along one edge of the panel to provide a channel between the projecting sheet members, whereby said channel may be used to receive an edge of a second panel therein to facilitate the fastening of adjacent panels.

11. The method of claim 10, wherein is included the step of installing electrical components in said channel.

* * * * *